United States Patent [19]

Kontomerkos

[11] 4,046,965
[45] Sept. 6, 1977

[54] TOLL RESTRICTOR FOR A TIME DIVISION TELECOMMUNICATION SYSTEM

[75] Inventor: Andrew Kontomerkos, Jackson, Tenn.

[73] Assignee: International Telephone and Telegraph Corporation, New York, N.Y.

[21] Appl. No.: 652,552

[22] Filed: Jan. 26, 1976

[51] Int. Cl.² .............................................. H04M 1/66
[52] U.S. Cl. .............................................. 179/18 DA
[58] Field of Search .................................. 179/18 DA

[56] References Cited

U.S. PATENT DOCUMENTS 3,671,677   6/1972   Lee et al. ..................... 179/18 DA

Primary Examiner—William C. Cooper
Attorney, Agent, or Firm—J. B. Raden; M. M. Chaban

[57] ABSTRACT

A toll restrictor is disclosed for use with a time division multiplex telephone switching system. The restrictor disclosed may serve an entire exchange, the restrictor having digit storage capability for each time slot used. The restrictor is capable of refusing or accepting a first digit and as many as six additional digits in the form of codes. Decisions by the restrictor are made on the basis of conditions programmed within the restrictor apparatus. Calls are completed or not depending on the decisions of the restrictor.

9 Claims, 10 Drawing Figures

TOLL RESTRICTOR DELAY WAVEFORMS

TOLL RESTRICTOR FOR A TIME DIVISION TELECOMMUNICATION SYSTEM

BACKGROUND OF THE INVENTION

1. Field of the Invention

A toll restrictor is disclosed for use with time division multiplex switching systems. In particular, the toll restrictor includes means for decoding TDM signals, comparing the decoded signals with memories of restricted codes and allowing or denying connections from calling lines to called lines.

2. Description of the Prior Art

Toll restrictors of many types are known in the telephone art and their functions are, of course, well-known. The present toll restrictor is especially adapted for use with a time division telephone switching system which may be of the type shown in U.S. Pat. No. 3,941,936 issued Mar. 2, 1976, as filed Oct. 4, 1974 in the name of Graham et al. and assigned to the assignee hereof.

In that system each circuit function is allotted to specific time slots. Thus, each register, each local link and each trunk has separate time slots assigned to it. A recirculating memory stores calling and called numbers using the time slots for call processing and for speech during a call. No provisions were made in this prior art to enable the restriction of calls to particular calling subscribers.

SUMMARY OF THE INVENTION

An object of the invention is to provide a toll restrictor responsive to incoming pulses from a time division switching system to allow calls to be forwarded from subscribers entitled to complete toll calls and the like while denying such privileges to subscribers not so entitled. An additional object is to provide an improved memory system for use in such a restrictor.

In a system employing a toll restrictor according to the invention, when an access code is dialed, a register associated with the station assumes a digit monitoring mode and the register's identity and status are indicated by a code 78. When idle, the register's identity and status are indicated by a code 7F. These two codes may each be detected by a decoder forming part of the toll restrictor where "78" initiates a restricting function in the restrictor and keeps the restricting function "on," while "7F" clears the restricting function; thereby reflecting the fact that an allow or deny decision has been made. When the restrictor operates in the restricting mode, dialed digits may be received by the restrictor through an interface and stored in a memory having a capacity for as many as seven digits. Comparisons are then made between the stored digit or digits, taken in groups of from one to seven at a time, and memories in a coded memory. Depending on whether a matching condition is found or not, decision circuitry provides allow or deny conditions at appropriate outputs of the restrictor which can be used, respectively, to complete connections or deny completion of connections.

Brief Description of the Drawings

The above mentioned and other features and objects of this invention and the manner of obtaining them will become more apparent, and the invention itself will be best understood by reference to the following description of an embodiment of the invention taken in conjunction with the accompanying drawings, in which:

FIG. 8 is a diagram illustrating how the circuits of FIGS. 2, 3, 4, 5, 6 and 7 are located and interconnected.

DESCRIPTION OF A PREFERRED EMBODIMENT

Circuits employed in the practice of this invention typically are mounted on printed circuit boards to make available an optional feature for a private automatic exchange or a private automatic branch exchange, either of which employs TDM signals. The boards are packaged to plug into any of several option positions of the PAX or PABX. The circuit may either deny or allow (refuse or accept) as many as seven digit codes, absorb as many as three digit codes on a per trunk group basis and accommodate as many as nine different trunk and/or tie line groups. It also provides a facility able to cope with dial tone delay (400 milliseconds to 6.4 seconds) from the central office. Deny, allow or absorb codes are programmed into an 8 kilobit memory which is composed of four 256x8 bit PROMS. Decisions can be taken at any digit depending on the programming of the PROMS.

Figure 1:
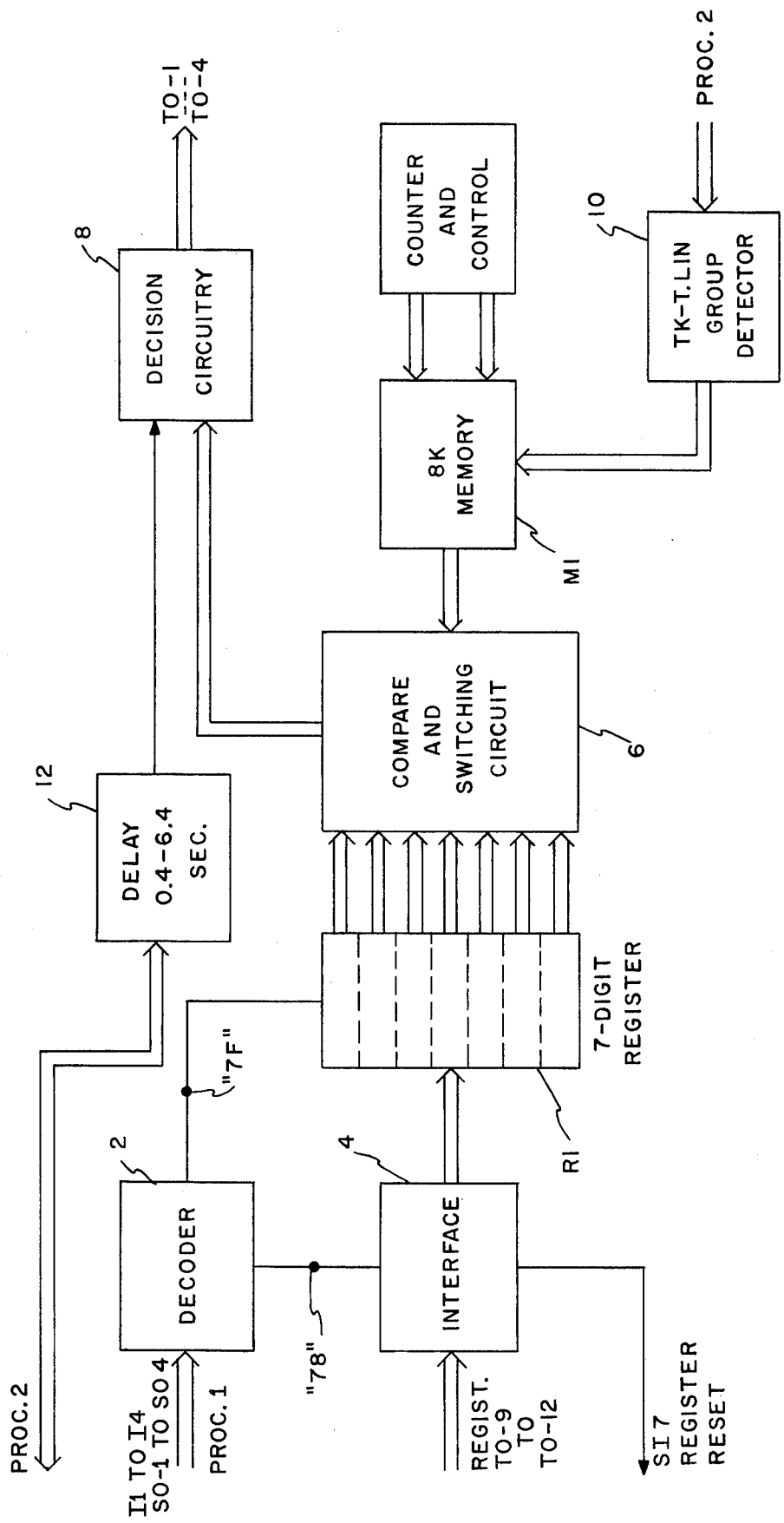
FIG. 1 is a block diagram of a toll restrictor in accordance with the invention.

A block diagram for an exemplary Toll Restrictor is shown in FIG. 1. In accordance with this block diagram, when a station is toll restricted and a trunk access code is dialed, the register (not shown) which is associated with this station goes into a digit monitoring mode and the register Identity and Status Out are indicated on the I and SO leads by the code signal 78. This "78" is in binary hexadecimal form in a preferred embodiment. When the register is idle its Identity and Status Out are indicated by 7F. These two codes are detectable by the decoder 2 of the Toll Restrictor where "78" initiates and keeps the restricting function "on," while "7F" clears it after an allow or deny decision has been made.

Note that the process of allowing or restricting a station is always done on a time slot basis which is associated with registers available in the system. Thus the following discussion will relate to a toll restrictor operating on a time slot basis in association with a register, where each of the time slots has a duration of one microsecond and each time slot recurs every 64 microseconds.

Dialed digits received through the interface 4 are stored in the 7-digit storage register R1 and are compared in the comparison and switching circuit 6 with the contents of the memory M1. Depending on whether a matching condition has been met or not, the decision circuitry 8 will provide an allow or deny condition at the output terminals (TO-1, TO-2, TO-3, TO-4).

The Trunk Tie Line group detector 10 enables programming of the Toll Restrictor on a per-group basis (Trunk or Tie Line Groups). A maximum of eight such groups is provided. The delay circuitry 12 provides a Central Office (C.O.) dial tone delay (400 milliseconds to 6.4 seconds) from the central office. If a number is dialed during the delay time the originating station is locked out automatically.

Figure 2:
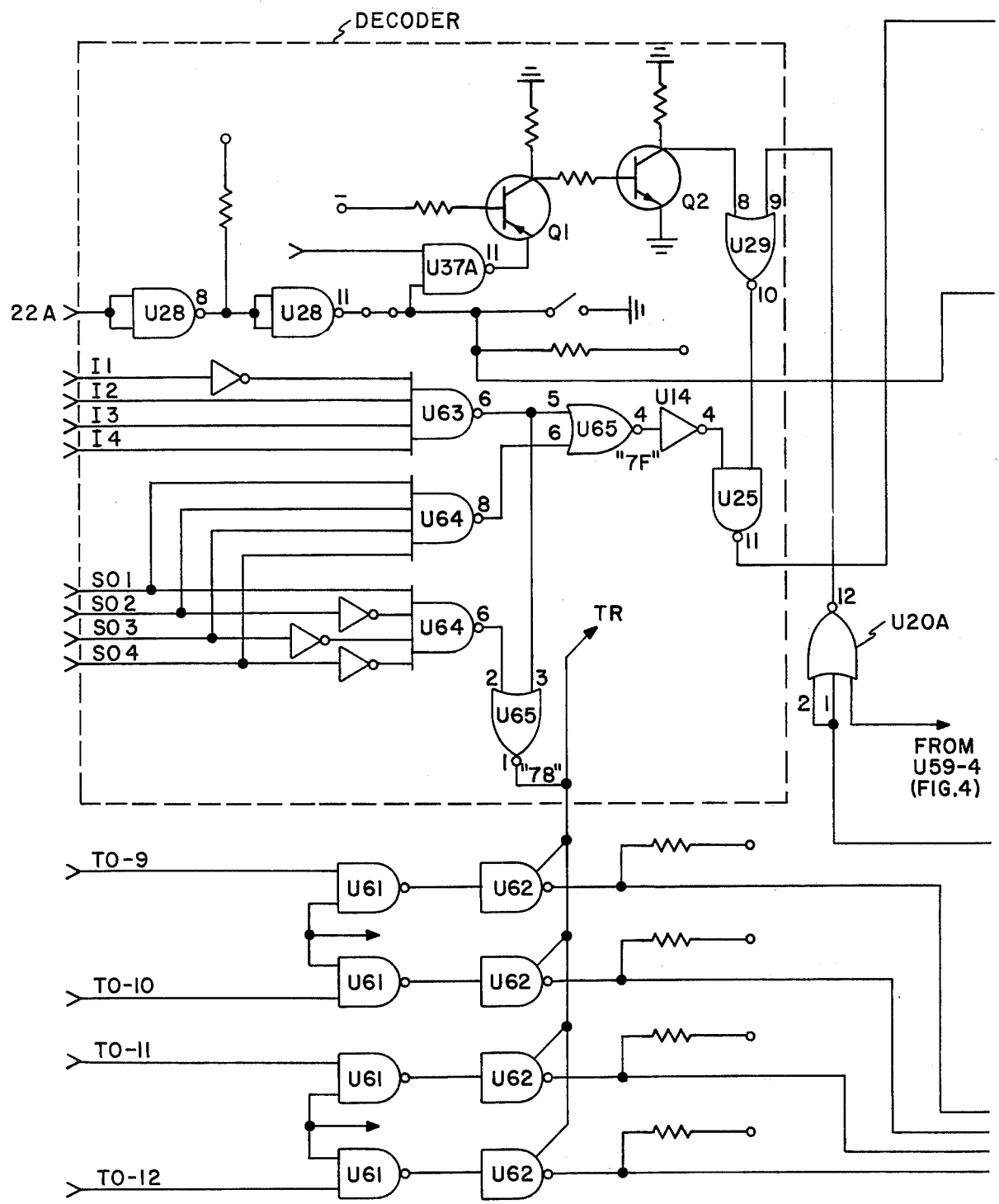
FIG. 2 is a diagram showing details of a decoder and the input circuits of an interface circuit according to the invention, FIG. 3 includes blocks which are interconnected to establish relationships between elements of a toll restrictor register and comparators.
Figure 3:
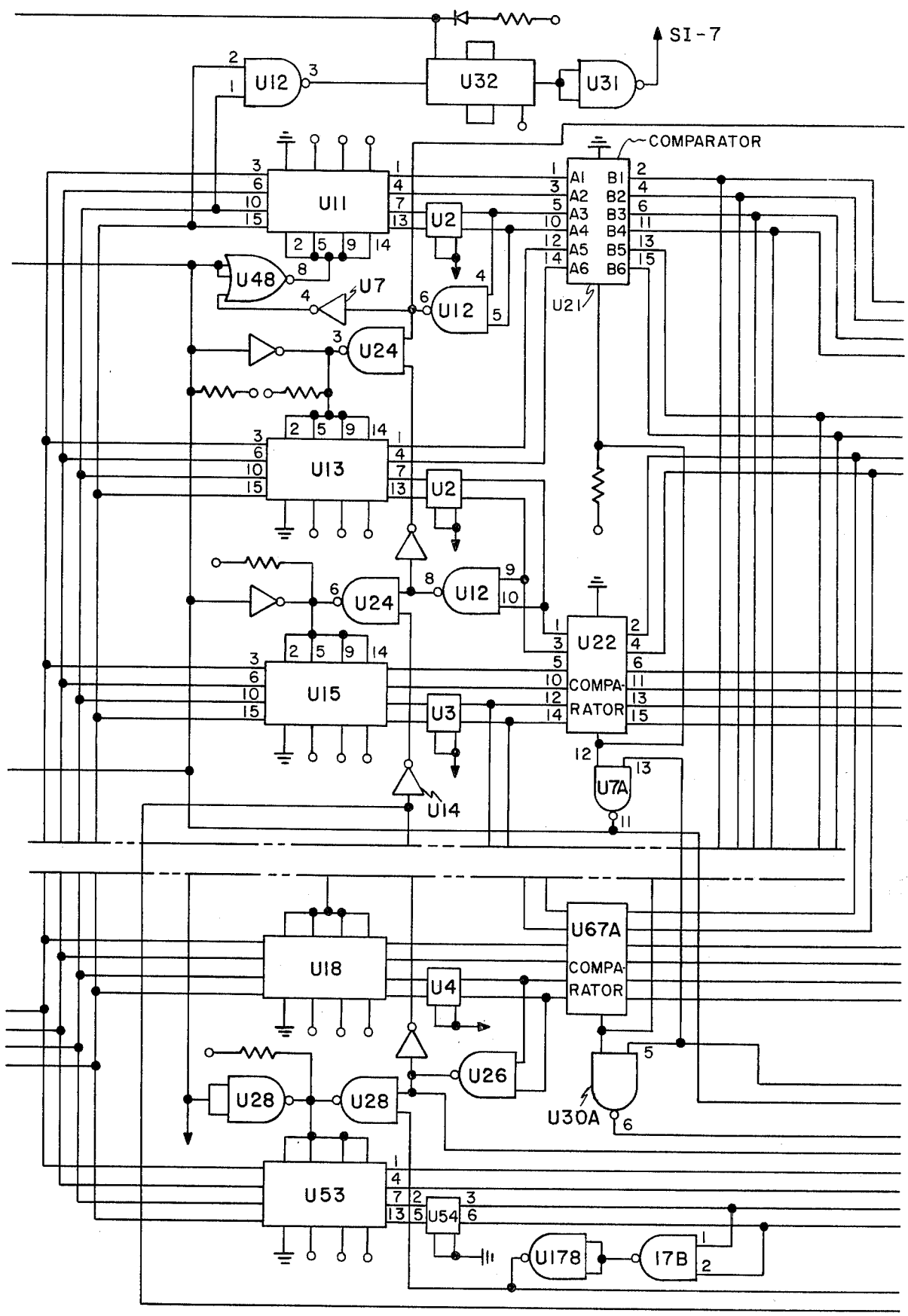

Turning now to FIG. 2, the restrictor is enabled through power on reset signal (POR) at 22A assuming the night switch (NS) is not set. When a register (not shown) in the PAX or PABX then goes to the toll monitoring mode, a "78" provided on the I1, I2, I3, I4, and SO1, SO2, SO3, SO4 leads produces a high at U65-1 which enables the input, output and delay circuits. At this point in time, the output of gate U25-11 is low (via U65-4, U-14-4, U29-10) and the outputs (1, 4, 7, 13) of register U11, (a 64x4 bit shift register in FIG. 3 which recirculates in synchronism with the system) are all high, while a low is generated at U48-8. This condition enables register U11 to store any information appearing at its inputs (3, 6, 10, 15). At this time, the outputs 1, 4, 7, 13 of registers U13, U15, U16 and U17A (not shown), U18 and U53 are all high with high levels at their respective control leads (2, 5, 9 and 14). Any information at the inputs of these registers will be be stored, but the previous information stored will be recirculated in synchronism with the system.

As soon as the first dialed digit is received through hundreds terminals TO-9, TO-10, TO-11, TO-12 and appropriately coupled gates U61 and U62 of the interface, it will appear at the inputs of all of the shift registers referred to above, but only U11 will accept it and store it. At the same time, U12-3 will go high (digit in) and after a delay of three microseconds a low is provided via U32 and U31 at terminal SI-7 to indicate a digit has been received from the register and the register is ready for the next digit. The signal at SI-7 resets the PAX or PABX register (not shown), so that the next digit dialed will appear on the same leads (hundreds TO-9 to TO-12).

The foregoing will recur every time a digit is entered into the Toll Restrictor. The first digit, stored in U11, appears 64 microseconds later at the inputs (1, 3, 5, 10) of register U21, and U12-6 goes high providing a high via U1-4 to U48-8 which forces the shift register U11 to a condition inhibiting the acceptance of new information appearing at the inputs and permitting recirculation of the number already in storage. Thus, the first digit dialed is stored at U11 and appears at the inputs of U21 every 64 usec. The high level at U12-6 generates a low at U24-3 and only register U13, alone among the registers, is enabled to accept new information. As soon as the second digit is dialed, register U13 stores it, a signal is generated at SI-7 and after 64 microseconds, U12-8 goes high enabling register U15 to accept the third digit. The sequence described above continues until a maximum of seven digits has been stored. All the digits stored are presented at the A inputs (corresponding to inputs at 1, 3, 5, 10, 12 14) to the 6 bit comparators U21, U22, U66 (not shown), U67A and U55.

Figure 4:
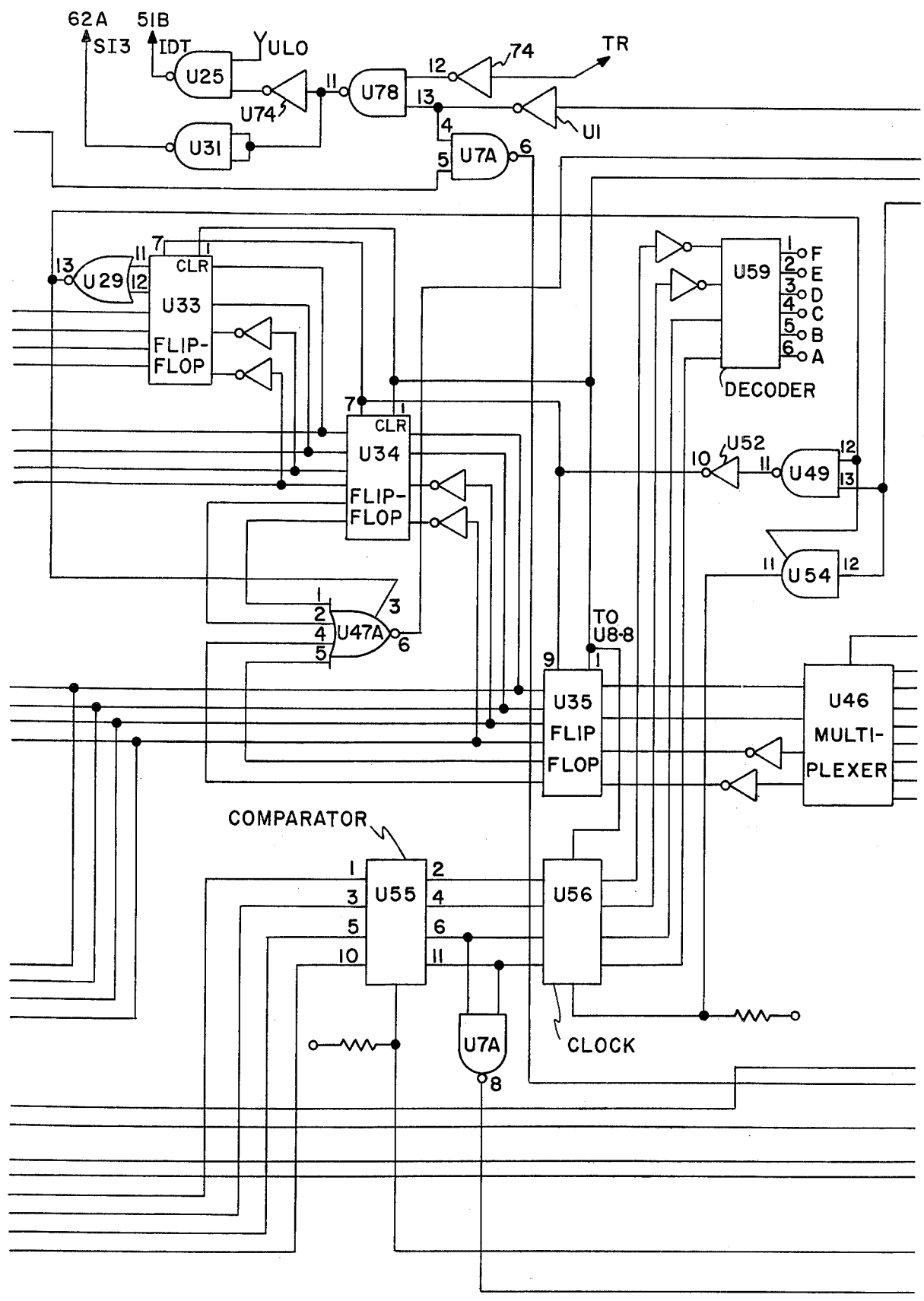
FIG. 4 shows relationships between block diagrams of switching circuits employed to provide signals from read only memories for comparison with dialed signals in the comparators.
Figure 6:
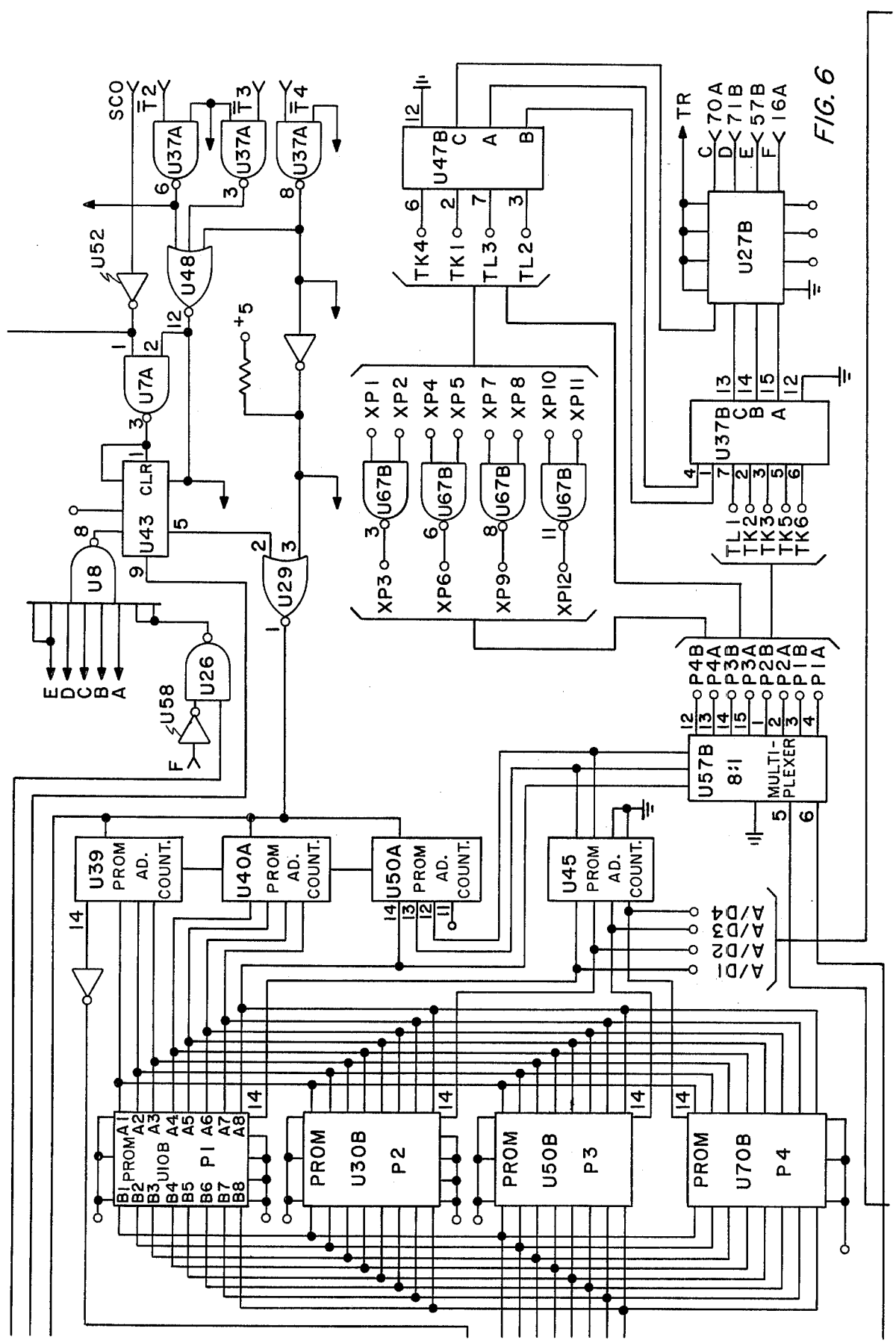
FIG. 6 shows the read only memories as block diagrams coupled through strapping means from trunk and tie line detectors.

The B inputs (2, 4, 6, 11, 13, 15) of the comparators referred to above are supplied from the multiplexer U46 (FIG. 4) which depends on the programming of the PROMS P1, P2, P3 and P4 (FIG. 6). The programming of the restricted, allowed or absorbed numbers is done in such a fashion that the first three digits are presented at the B inputs of the comparators U21 and U22. If they match the first three digits dialed, then a "wait for more digits" command is generated and the next three digits are presented at the B inputs of comparators U66 (not shown) and U67A. If there is a matching condition of these three digits, a "wait for seventh digit" command is generated and the seventh digit comparison is done by U55, FIG. 4.

The codes are read out of the PROMS and presented at the B inputs of the comparators (U21, U22, U66, U67A and U55) in the following manner. The quad-D flip-flops U33, U34, U35 and clock U56 of FIG. 4 in cooperation with multiplexer U46 and the clocking circuitry act as a four-digit parallel-to-serial converter. Thus, for a three digit number, the first digit would be stored at the outputs of U33, having passed through U35 and U34, the second digit would be stored at the outputs of U34, having passed through U35, and the third digit would be stored at the outputs of U35. Assuming that we had a four digit number, the fourth digit would be stored at the outputs of U56.

Notice that as soon as U33 stores a digit, U29-13 goes low, causing U49-11 to go high and enabling U54-11 to apply a signal to clock U56. At the end of each number, a hexadecimal character (A, B, C, D, E, or F) is programmed which is decoded by U59, where the code is in accordance with Table I. A high is generated at U8-8 (FIG. 6) and a high is provided at U43-5 which disables the NOR gate U29-1, so that further advancement of the PROM address counters (U39, U40A and U50A) is inhibited. Thus, the number is stored and remains at the outputs of U33, U34, U35 and/or U56 until U43 is reset. Notice that U43 is reset by a signal at SCO (scan channel zero) from common service circuits (not shown) at the zero time slot and at the same time U33, U34, U35 and U56 are cleared over their terminals 1 from U43-9 so that a new number can be stored. The four PROMS are scanned each one in turn as the CE or CHIP ENABLE lead (pin 14) goes low and a specific PROM is enabled as the other three are disabled. This function is obtained through U45 which decodes the extended counting of U50A.

TABLE I

| Hexadecimal and Alphanumeric Equivalents | | | | |
|---|---|---|---|---|
| Bits | | | | Alphanumeric |
| D | C | B | A | Equivalent |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | A |
| 1 | 0 | 1 | 1 | B |
| 1 | 1 | 0 | 0 | C |
| 1 | 1 | 0 | 1 | D |
| 1 | 1 | 1 | 0 | E |
| 1 | 1 | 1 | 1 | F |

Trunk or Tie Line group selection is obtained over terminals 70A, 71B, 57B, 16A through U27B, U37B, U47B and U57B (FIG. 6). U27B detects the Trunk or Tie Line group at C, D, E, and F and stores it (recirculates it), then the group code is decoded by U37B and U47B. Depending on the strapping, the 8:1 multiplexer U57B will then produce a high level at terminals 5, 6 leading to U54-10 and U30A-5, U7A-13. Thus a low level at terminal 5 or 6 will mean there has been a successful comparison of the number dialed with a number in a specific PROM which has been assigned to this specific trunk or tie line group. In the case in which a three digit number has been dialed and stored in registers U11, U13, and U15, but this number does not exist in the PROM group corresponding to the trunk or tie-line called, a decision whether a deny or allow condition will be produced at the output, after U59-5 goes low twice (START END PULSE B). This depends on A1 to A4 strapping.

Figure 7:
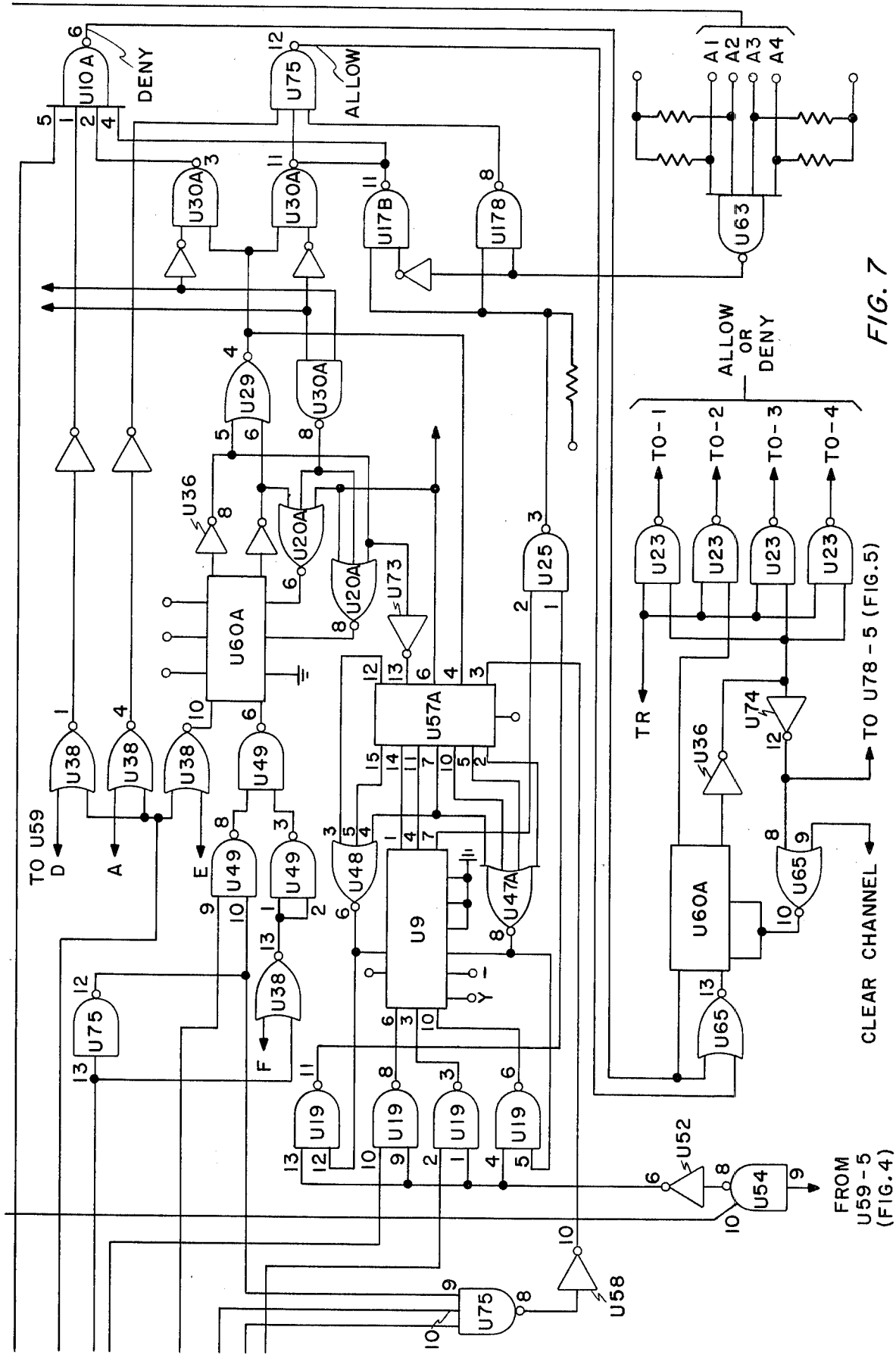
FIG. 7 is a block diagram of decision circuitry employed in the invention.

U54-9 (FIG. 7) will go low (programmable character B from U59-5, FIG. 4) twice for each trunk or tie-line group programmed for some kind of restriction. The character (B) is programmed at the beginning and the end of each group such that there is an indication of START and END of the programming of each group. With the START of a group and the third digit in, a low is generated at U19-3 which appears at U9-1 after 64 microseconds and delayed by 62.5 microseconds at U57A-15. This produces a low at U48-5 which, in turn, generates a high at U48-6 which causes store U9 to recirculate the low level that previously appeared at U19-3. When the START END pulse appears again at U54-9 coincidental with the tie-trunk group, U19-4 will go high and U19-3 and U19-11 will go low. This will generate a high at U25-3 and, depending on the A1 to A4 strapping, it will either produce a deny or an allow code at TO-1 through TO-4. To deny, no strapping is necessary; to allow, strapping is done on a per PROM basis and A/D1 (FIG. 6) is strapped to A1 (FIG. 7) for first PROM, A/D2 is strapped to A2 for second PROM, etc.

In the case of six digits, the first three digits must match a programmed three-digit number which is followed by a "wait for more digits" code. This generates a low at U36-8; thus a high is generated at U57A-12 which produces a low at U48-6 and resets the recirculation of the third digit-in signal. As soon as the sixth digit is dialed, U19-8 goes low and U47A-8 goes high to recirculate the low generated at U19-8. If the last three digits do not compare favorably, an allow or deny will be generated at the output depending on the A/D1 to A/D4 strapping. If all six digits compare and there is no seventh digit programmed, a high is generated at U29-4 which cancels the high at U47A-8. Depending upon whether the code was programmed for allow or deny, a high appears at U75-12 or U10A-6, respectively. This condition is stored at U60A and creates the final output condition. If a seventh digit is programmed, a high is generated at U7A-8 for 64 microseconds which enables the three-input gate U75; U75-8 goes low to cancel the high at U47A-8.

Notice that U29-4 is low in this case. As soon as the seventh digit has been dialed, U75-9 goes low disabling this gate. If there is a seventh digit comparison, U29-4 goes high and the sequence is as follows. If the seventh digit does not compare favorably, then after the START END pulse of the group, U25-3 goes high and, again depending on the A1 to A4 strapping, an allow or deny code will be generated at the outputs.

Figure 5:
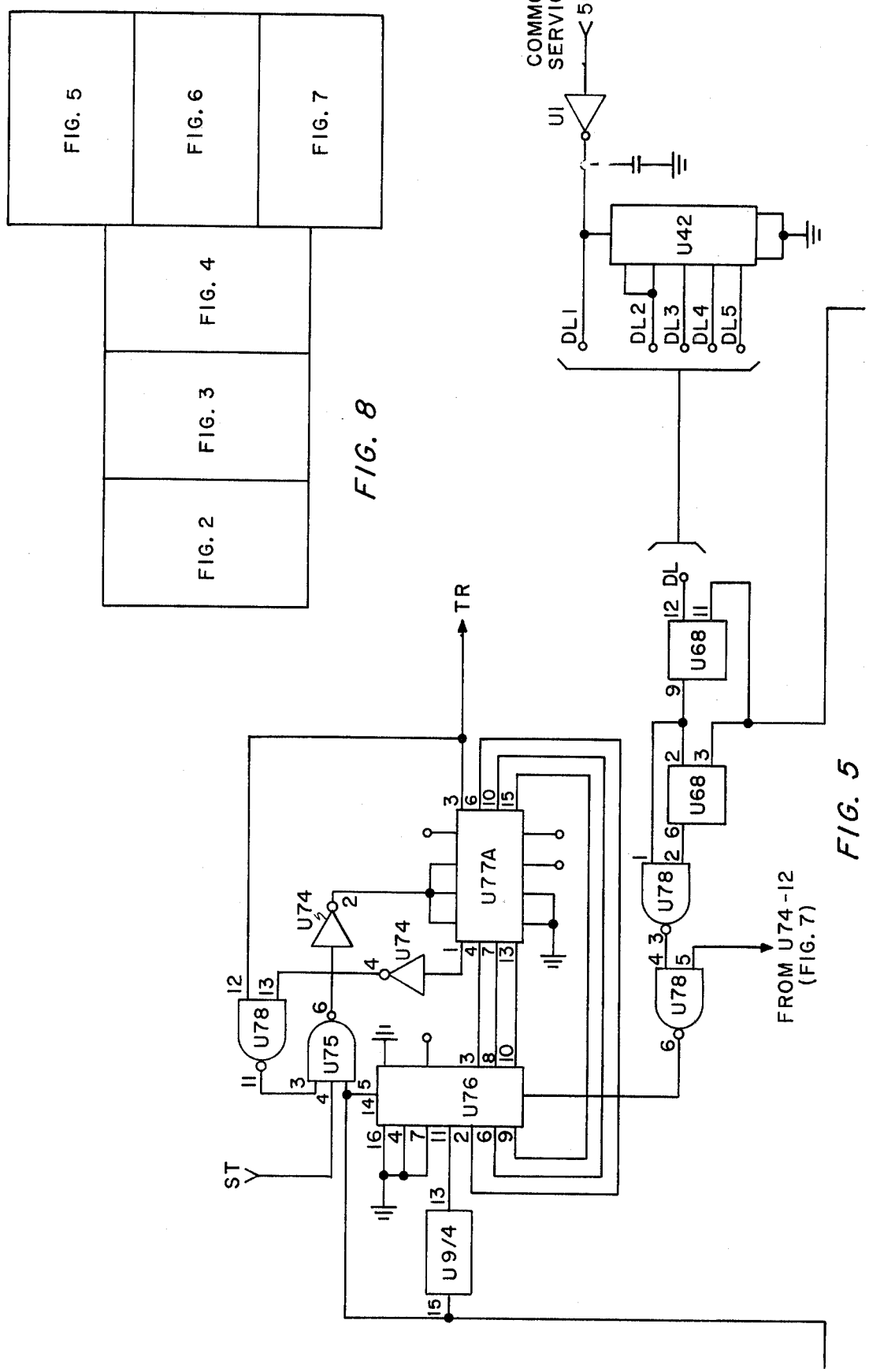
FIG. 5 is a block diagram illustrating means by which delay is provided per channel.
Figure 9:
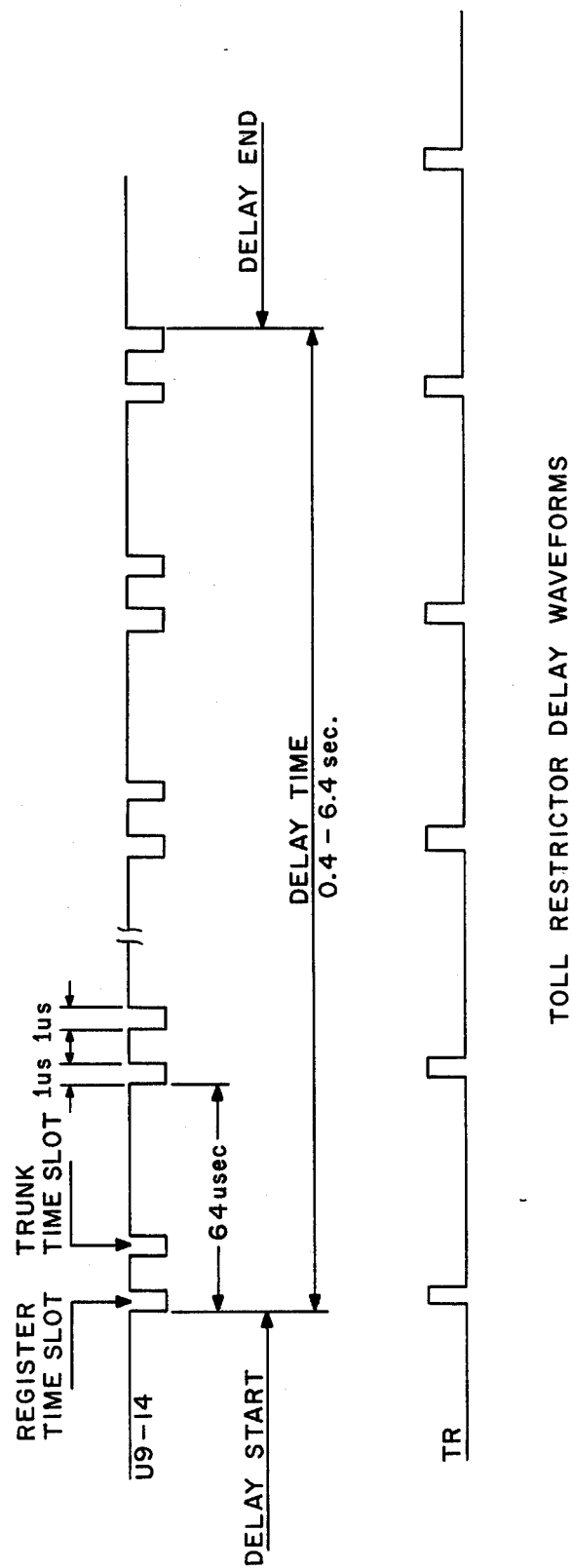
FIG. 9 depicts delay waveforms relative to TR.
Figure 10:
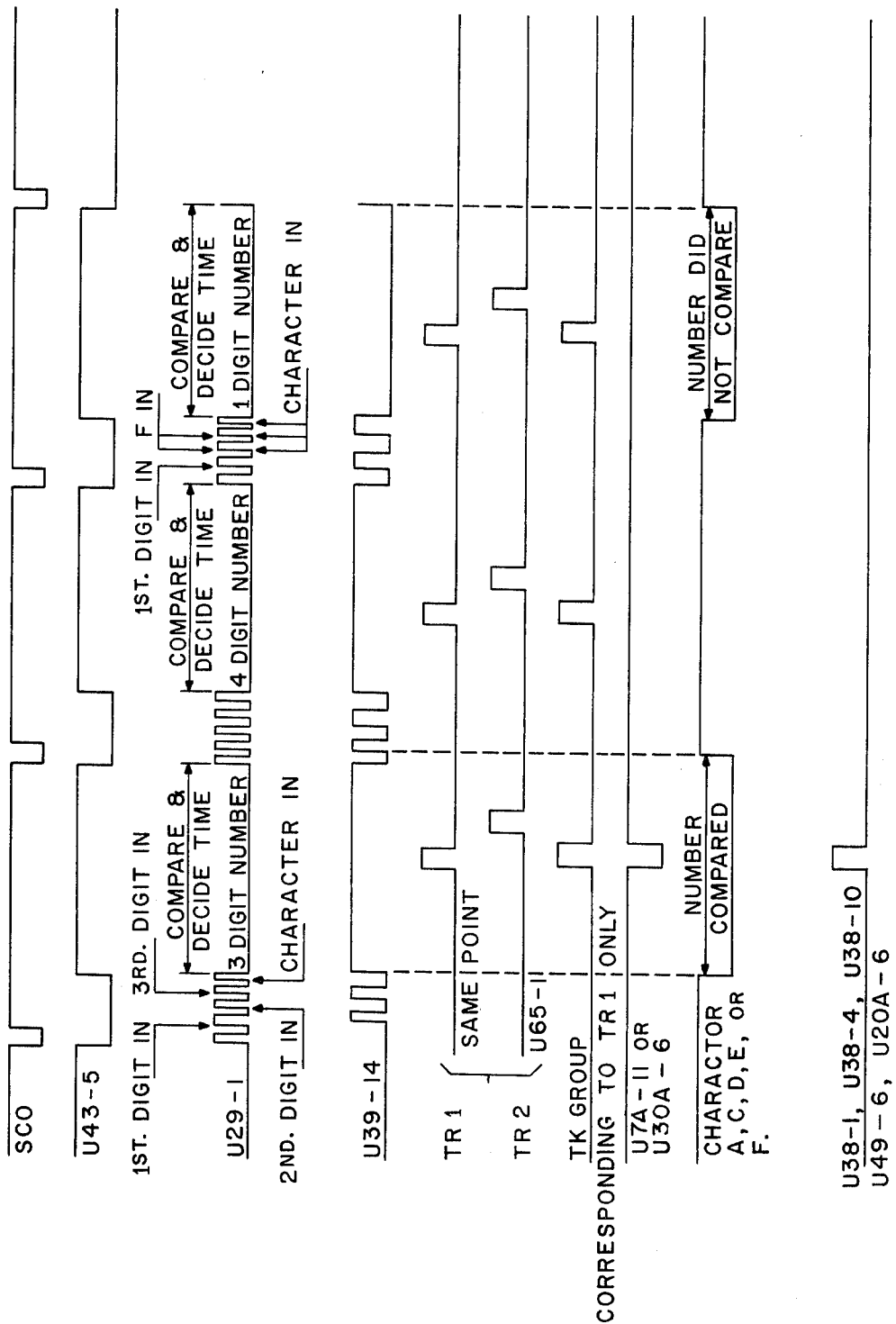
FIG. 10 shows timing waveforms from PROM readout in comparison with a number dialed.

In FIG. 5, the circuit formed by U42, U68, U77A, U76 and some additional gating provides a per channel delay which depends for duration on the strapping used between U42 and U68, e.g.: DL to DL1 = 0.4 sec.; DL to DL2 = 0.8 sec.; DL to DL3 = 1.6 sec.; DL to DL4 = 3.2 sec. and DL to DL5 = 6.4 sec. At the beginning of each delay pulse (from DL1 to DL5) a high for 64 microseconds is generated at U78-6 which feeds the carry-in input 13 of the 4-bit full adder U76. After eight of these pulses, the carry-out lead U76-14 becomes high and U74-2 goes high so that it recirculates the high levels of the 4, 7 and 13 pairs of the 64 × 4 bit shift register U77A. After 64 microseconds, U76-11 becomes high and adds one to the A1, A2, A3, A4 inputs of the adder which are all high, thus keeping the carry out lead 14 at a high level. The delay is initiated by the TR signal at the register's time slot and the ST signal from Processor 2 at the time slot of the trunk or tie-line. Figure 9 shows the delay waveform.

During the delay time, an IDT (inhibit decode terminator) signal is applied to the common control memory (not shown) which inhibits the central office dial tone through the originating line. At the same time, an SI-3 is generated which provides a nonrelease condition for the trunk. If a digit is dialed during this delay time U7A-6 (FIG. 4) goes low and U10A-6 (FIG. 7) goes high thus generating a deny condition at the output.

Notice that U47A-6 (FIG. 4) provides a signal which enables the restrictor to take decision at any digit, for example deny zero in first digit, and is programmed as OFF. Also notice that U20-A-12 (FIG. 2) provides an "ABSORB" signal in response to "C" from U59-4 (FIG. 4) which actually is a forced reset of the restrictor.

PROM PROGRAMMING

Each PROM is divided into two groups in which the first group (A) is considered to be from address "00" to "7F" and the second group (B) from "80" to "FF." Thus four PROMS involve eight groups: P1A and P1B from PROM #P1; P2A and P2B from PROM #P2; P3A and P3B from PROM #P3; and P4A and P4B for PROM #P4. these half PROM groups can be combined together and create a larger group depending on the number of codes which have to be programmed. Notice that in each half PROM group a maximum of 64 different three-digit numbers can be programmed, since each number is followed by an action, assume that a system has trunk groups TK1, TK3, TK6, and TL2. Assume also that 150 three-digit numbers are required for TK1, 100 for TK3, 120 for TK6 and 30 for TL2. This means that one and a half PROM must be devoted for TK1, one PROM for TK3, one for TK6 and half for TL1. The strapping could be as follows: FOR TK1, from TK1 (U47B, FIG. 6) to P1A, P1B and P2A (U57B, FIG. 6); for TL1, from TL1 (U37B) to P2B; for TK3, from TK3 to P3A and P3b; and for TK6, from TK6 to P4A and P4B.

In case two Trunk or Tie Line groups require exactly the same codes, for example, in case TK1 and TK2 require the same 100 codes, then instead of programming twice the following strapping scheme could be used. Using PROM #1 strap TK1 to XP1, TK2 to XP2, and XP3 to P1A and P1B.

The maximum capacity of all PROM's is 511 three-digit codes followed by an action character. Thus the maximum number of codes that could be programmed for only one trunk group per board is limited to 511 three-digit codes. As many as four boards can be plugged in parallel to increase the capacity to 2000 three-digit codes with the only restriction that for any given trunk or tie line group, one toll restrictor must be on one board. For example, TK1 requires 450 codes, TK2 300 codes and TK3 250 codes. Three boards must be used, one for each trunk and programming cannot be, for example, board #1 programmed with 450 TK1 codes and 60 TK2 codes, and board #2 programmed 240 codes for TK2 and 250 for TK3.

Each character following a code has a specific meaning. These are:

TABLE II
Action Characters

A = Allow
D = Deny
C = Absorb
E = Allowable area code in; wait for more digits or end of 7 digits.
F = Area code and central office code in.
B = Start-End count of group (programmed only once per group).

An "A" following a 3-digit code means allow this code. A "D" following a 3-digit code means deny this code. A "C" following a 3-digit code means absorb this code. An "A" following a group of codes means allow all calls in this group. A "D" following a group of codes means deny all calls in this group. The character "B" is programmed only once per trunk or tie line group and can be anywhere in the group. The character "E" is programmed right after the first three digits if more digits are to be checked, it also follows the last digit if seven digits are being checked. The PROM (Table 2) indicates most of the possible programming combinations. In this table X is any digit from 0 to 9 and N is any digit from 2 to 9. Notice also that the addresses desginated are only for reference and could be anything from "00" to "FF". The character "B" is usually programmed at address "00" or at the beginning of the group for ease of reference.

TABLE III
PROM Programming Table

| ADDRESS | | |
|---|---|---|
| 00 | FB | Start of group |
| 01 | XF | Allow |
| 02 | FA | 1st digit |
| 03 | XX | Allow first |
| 04 | FA | Two digits |
| 05 | XX | Allow |
| 06 | XA | Three digits |
| 07 | XF | Deny |
| 08 | FD | First digit |
| 09 | XX | Deny first |
| 0A | FD | Two digits |
| 0B | XX | Deny |
| 0C | XD | Three digits |
| 0D | XF | Absorb |
| 0E | FC | First digit |
| 0F | XX | Absorb First |
| 10 | FC | Two digits |
| 11 | XX | Absorb |
| 12 | XC | Three digits |
| 13 | XX | |
| 14 | XE | |
| 15 | XF | Allow |
| 16 | FF | Four digits |
| 17 | A | |
| 18 | XX | |
| 19 | XE | Allow |
| 1A | XX | Five Digits |

TABLE III-continued
PROM Programming Table

| ADDRESS | | | |
|---|---|---|---|
| 1B | FF | | |
| 1C | A | | |
| 1D | XX | | |
| 1E | XE | Allow | |
| 1F | XX | Six digits | |
| 20 | XF | | |
| 21 | A | | |
| 22 | XX | | |
| 23 | XE | Allow | |
| 24 | XX | Seven | |
| 25 | XX | Digits | |
| 26 | EA | | |
| 27 | XX | | |
| 28 | XE | Deny | |
| 29 | XF | Four | |
| 2A | FF | Digits | |
| 2B | D | | |
| 2C | XX | | |
| 2D | XE | Deny | |
| 2E | XX | Five | |
| 2F | FF | Digits | |
| 30 | D | | |
| 31 | XX | | |
| 32 | XE | Deny | |
| 33 | XX | Six | |
| 34 | XF | Digits | |
| 35 | D | | |
| 36 | XX | | |
| 37 | XE | Deny | |
| 38 | XX | Seven | |
| 39 | XX | Digits | |
| 3A | ED | | |
| 3B | NX | Area | |
| 3C | XE | Code | |
| 3D | XX | C.O. #1 | Allow |
| 3E | XF | | These |
| 3F | XX | C.O. #2 | Central |
| 40 | XF | | Office Codes |
| " | " | | Under |
| " | " | | The Above |
| " | " | | Area |
| " | " | | Code |
| " | XX | C.O. #12 | |
| " | XF | | |
| " | A | | |

Change to "D"
For Deny this
group

While the principles of the invention have been described above in connection with specific apparatus and applications, it is to be understood that this description is made only by way of example and not as a limitation on the scope of the invention.

I claim:

1. A toll restrictor for use with a TDM switching system, adapted to receive digits representing calling information for generating restrictor initiating signals, and comprising: a decoder, said decoder responding to said restrictor initiating signals for generating and transmitting a first coded signal to enable intitiation of a restricting function and to maintain the restricting function during the receipt of digits from a calling station, first memory means, interface circuits coupled responsive to said first coded signal to transmit digits received from a calling station to said first memory means, second memory means containing data identifying restrictions applicable to all potential calling stations, comparison means coupled to said first memory means and to said second memory means, said comparison means providing additional signals to said system indicating whether a call from said calling station may be allowed or denied and said decoder responsive to said additional signals to clear said restricting function.

2. The invention as claimed in claim 1, including decision circuits coupled to the comparison means responsive to said additional signals to provide deny or allow signals.

3. The invention as claimed in claim 2, including means in said decision circuits for forwarding said deny or allow signals for application to said TDM system.

4. The invention as claimed in claim 3, in which the decoder includes logic circuits responsive to the first coded signal to apply said first coded signal to energize logic circuits in said interferface circuits.

5. The invention as claimed in claim 2, in which said first memory means includes a plurality of storage areas, with each area for storing information regarding a call being processed through separate channels of said TDM system, and including delay circuits coupled to said decision circuits to provide a per channel delay to the decision circuits.

6. The invention as claimed in claim 5, in which the delay circuits incorporate a plurality of means to provide different delays for selected channels.

7. A call restrictor for a telephone system employing time division switching, said restrictor including a decoder responsive to call data representing called and calling station information for generating a restriction enabling signal, first memory means responsive to said signal for storing data of the calling station information, second memory means for storing restriction data, comparison means enabled responsive to the storage of data in said first memory means for comparing data from said first memory means against data from said second memory means to produce coded output signals, logic means responsive to said output signals to allow or deny the call represented by said call data or to continue operation of said comparison means for comparing further digits of said call data with data from said second memory means, said decoder responsive to output signals indicating allow or deny to terminate said restriction enabling signal.

8. A restrictor as claimed in claim 7, in which said first memory means comprises a recirculating shift register including storage areas for storing call data concerning a plurality of calls.

9. A restrictor as claimed in claim 8, in which said second memory means comprises a memory array which may be programmed in a plurality of different program settings.

* * * * *